United States Patent [19]

Popa

[11] Patent Number: 5,380,691
[45] Date of Patent: Jan. 10, 1995

[54] CATALYTIC MICROPOROUS ZIRCONIA PARTICULATES

[75] Inventor: Jean-Michel Popa, Drancy, France

[73] Assignee: Rhone-Poulenc Chimie, Courbevoie, France

[21] Appl. No.: 897,755

[22] Filed: Jun. 12, 1992

Related U.S. Application Data

[63] Continuation of Ser. No. 521,840, May 10, 1990, abandoned.

[30] Foreign Application Priority Data

May 10, 1989 [FR] France .................... 89 06090

[51] Int. Cl.$^6$ ............. B01J 27/053; B01J 27/18; B01J 27/232; B01J 27/25; B01J 31/38; B01J 37/30; B01J 21/06
[52] U.S. Cl. ................... 502/170; 502/348; 502/201; 502/217; 502/174; 502/208; 502/171
[58] Field of Search ........... 502/349, 201, 217, 174, 502/208, 170, 171

[56] References Cited

U.S. PATENT DOCUMENTS

| | | | |
|---|---|---|---|
| 3,132,110 | 5/1964 | Hansford | 502/217 |
| 4,600,702 | 7/1986 | Schumacher | 502/349 X |
| 4,661,330 | 4/1987 | Chane-Ching et al. | 502/304 X |
| 4,845,069 | 7/1989 | Fellman et al. | 502/208 |
| 5,015,373 | 5/1991 | Carr et al. | 502/402 X |
| 5,064,628 | 11/1991 | Chane-Ching et al. | 502/304 X |

FOREIGN PATENT DOCUMENTS

| | | |
|---|---|---|
| 0331283 | 9/1989 | European Pat. Off. . |
| 50-021996 | 3/1975 | Japan . |
| 1335626 | 10/1973 | United Kingdom . |

OTHER PUBLICATIONS

Patent Abstract of Japan, vol. 10, No. 128, pub. May 13, 1986; JP-A-60-266-622 Derwent Abstract Only.
Patent Abstract of Japan, vol. 12, No. 198, pub. Jun. 8, 1988; No. JP-A-63-2809 Derwent Abstract Only.

*Primary Examiner*—Helen M. S. Sneed
*Assistant Examiner*—Douglas J. McGinty
*Attorney, Agent, or Firm*—Burns, Doane, Swecker & Mathis

[57] ABSTRACT

Highly microporous zirconia particulates having pore sizes of an average diameter of less than 20 Å (2 nm), well adapted as catalysts and catalyst supports, are prepared by thermohydrolyzing a zirconium salt, separating the resulting precipitate from the medium of thermohydrolysis and then calcining such precipitate, and wherein an anion more covalent than the hydroxyl anion, e.g., a nitrate, sulfate, phosphate or carboxylate, is incorporated into such precipitate upstream of the calcination thereof.

32 Claims, No Drawings

CATALYTIC MICROPOROUS ZIRCONIA PARTICULATES

This application is a continuation, of application Ser. No. 07/521,840, filed May 10, 1990, abandoned.

BACKGROUND OF THE INVENTION

1. Field of the Invention

The present invention relates to a novel zirconium oxide typically described as "zirconia" and more especially, relates to novel microporous zirconia particulates, to a process for the production thereof, and to the use of such novel zirconia particulates as catalysts and catalyst supports.

2. Description of the Prior Art

In the field of catalysis and particularly heterogeneous catalysis, the catalysts or catalytic carriers must be materials having a large specific surface area and a high porosity. In catalytic applications where selectivity in respect of the form of the reagents, products and/or intermediates in the reaction is required, microporosity, i.e., porosity on a molecular scale, is particularly required.

It is known to this art to use bridged zeolites and clays for heterogeneous catalysis since they satisfy the above microporosity requirements. Materials of this type belong to the same families of silicates or aluminophosphates.

SUMMARY OF THE INVENTION

Accordingly, a major object of the present invention is the provision of a novel zirconia material well adapted for catalyst applications and which markedly differs in terms of chemical composition from those microporous materials heretofore used for such applications; thus, the novel zirconia of the invention presents the option of conducting a given catalytic operation in the presence of a diverse catalyst with a view towards obtaining like, modified and/or improved properties/results.

Another object of this invention is the provision of a novel zirconia material having a high porosity.

Still another object of this invention is the provision of novel zirconia particulates having a high microporosity.

Still another object of the present invention is the provision of novel zirconia particulates having a high porosity, which high porosity is stable at elevated temperatures.

Another object of the present invention is the provision of a process for the production of the aforesaid highly porous zirconia particulates.

Briefly, the present invention features novel microporous zirconia particulates having pore sizes with an average diameter of less than 20 Å (2 nm) and preferably no greater than 15 Å (1.5 nm).

DETAILED DESCRIPTION OF THE PREFERRED EMBODIMENTS OF THE INVENTION

More particularly according to the present invention, it should be appreciated that the specific surface areas reported hereinafter are determined by nitrogen adsorption by the Brunauer-Emmett-Teller method described in *Journal of the American Chemical Society*, 60, 309 (1938).

The pore volume and pore sizes are also determined by the B.E.T. method, just as is the specific surface area, down to pore diameters of less than 200 Å (20 nm).

The pore volumes for pores smaller than 600 Å (60 nm) in diameter is measured using a mercury porosimeter, in accordance with standard ASTM D 4284-83.

The pore volumes for micropores smaller than 15 Å (1.5 nm) in diameter is determined by the xenon NMR method, as described by Fraissard, *Journal de Chimie Physique*, 6, 83 (1986).

Since pore volume and specific surface area decrease with higher calcination temperatures, it is important to define the calcination temperature. Thus, the pore volumes and specific surface areas reported herein are measured on a product that has been calcined for at least two hours.

An increase in the calcination temperature or the temperature at which a given porous product is actually used is known to this art to effect a decrease in specific surface area and pore volume.

The zirconia material according to this invention has the characteristic property of maintaining a large specific surface area corresponding to micropores at high temperatures.

Thus, it has a specific micropore surface area of at least 150 m$^2$/g, measured after calcination at 300° C., and at least 90 m$^2$/g measured after calcination at 400° C. This surface area preferably ranges from 90 m$^2$/g to 220 m$^2$/g, measured after calcination at a temperature of from 300° to 400° C.

The specific surface area corresponding to micropores ranges from about 10 m$^2$/g to 220 m$^2$/g, measured after calcination at a temperature of from 200° to 600° C.

It advantageously has a total specific surface area of at least 90 m$^2$/g, preferably ranging from 100 to 250 m$^2$/g, measured after calcination at a temperature of from 300° to 400° C.

The zirconia particulates of the invention have high porosity. The pore sizes range from about 4 Å (0.4 nm) to 200 Å (20 nm).

One of the characteristics of the zirconia particulates of the invention is that they exhibit a dual population or bifold pore distribution. The average diameter of the micropores is less than 15 Å (1.5 nm) and greater than 5 Å (0.5 nm), and the average diameter of the mesopores ranges from 15 Å (1.5 nm) to 200 Å (20 nm).

The novel zirconia particulates preferably contain micropores having an average diameter of from 8 Å (0.8 nm) to 12 Å (1.2 nm).

By "average diameter" is intended a diameter such that all of the pores smaller than such value constitute 50% of the total pore volume (Vp).

The total pore volume of the zirconia particulates according to the invention is preferably at least 0.1 cm$^3$/g, measured after calcination at a temperature of from 300° to 400° C.

The preferred zirconia particulates of the invention have a total pore volume of from 0.15 to 0.25 cm$^3$/g, measured after calcination at a temperature of from 300° to 400° C.

The zirconia particulates of the invention have high microporosity. The pore volume of the micropores is at least 0.01 cm$^3$/g, and preferably ranges from 0.03 to 0.1 cm$^3$/g, measured after calcination at a temperature of from 300° to 400° C.

Another characteristic of the zirconia material according to the invention is that it has a high microporosity relative to the total pore volume. Thus, the percentage ratio of the pore volume of the micropores to the pore volume for the sum of the micropores and mesopores (less than 20 nm) advantageously ranges from 40% to 70%.

The zirconia particulates of the invention, surprisingly, have a high microporosity, even after high temperature calcination. This is particularly significant insofar as prospective catalytic applications are concerned.

These particulates also have the special characteristic of being able to contain a small amount of an anion which is more covalent than the hydroxyl anion. It should be appreciated that the molar ratio of the number of moles of anions to the number of moles of zirconium is less than 0.5 and preferably ranges from 0.01 to 0.2.

This invention also features a process for the production of the microporous zirconia particulates described above.

Such process comprises conducting a thermohydrolysis of a zirconium salt, and then separating the resulting precipitate and calcining it, and wherein at least one anion more covalent than the hydroxyl anion is introduced into the reaction medium prior to the calcination stage.

By "thermohydrolysis" is intended hydrolysis of the zirconium salt by heating a solution thereof.

By "an anion more covalent than the hydroxyl anion" are intended those anions which can be substituted for the surface hydroxyl anions of the zirconia.

In a first embodiment of the process of the invention, the anion more covalent than the hydroxyl anion is introduced during thermohydrolysis.

In a second embodiment, the anion is introduced after the separation stage, but prior to calcination.

In the first process embodiment of the invention, the zirconia precursor is prepared in a preliminary stage.

This is accomplished by beginning with a zirconium salt. Exemplary such zirconium salts are halogenated, oxyhalogenated or perhalogenated zirconium compounds, more specifically zirconium chloride, zirconium bromide, zirconium iodide, zirconyl chloride, zirconyl bromide or zirconyl iodide.

Zirconium chloride $ZrCl_4$ and zirconyl chloride $ZrOCl_2$ are the preferred.

Either an anhydrous or a hydrated form of such compounds may be used.

The purity of the starting material salt is dependent upon the ultimate application intended.

It may be advantageous, for example, to use a zirconium salt of over 95% purity.

The zirconium salt is employed in aqueous solution, its concentration being dictated only by the solubility limits thereof. The concentration of the aqueous solution of zirconium salt, expressed in zirconium ions, preferably ranges from 1 to 1.5 moles/liter.

The zirconium salt is hydrolyzed in the presence of an anion more covalent than the hydroxyl anion. Exemplary of such anions are the inorganic anions, e.g., nitrate, sulfate, carbonate or phosphate, or organic anions such as the carboxylates, e.g., acetate, citrate, and the like. These may be provided by either a salt or an acid.

The ions may be provided by a salt, preferably an alkali metal salt, such as sodium, an alkaline earth metal salt or an ammonium salt. The ammonium salt is preferred because the ammonium ion can easily be removed by heat treatment.

The salt providing the anion may be employed in either solid or aqueous form.

The anion generators may also be acids, preferably nitric, sulfuric, phosphoric, acetic, citric acid, and the like. They may be used in dilute or concentrated form. The normality of the acid solution typically ranges from 1 to 5N.

The sulfate anion is particularly preferred from among the above anions. It should preferably be added to the medium in the form of ammonium sulfate or sulfuric acid, or by bubbling a gas containing sulfur, such as sulfur dioxide or sulfur trioxide, into water.

The order in which the anion and zirconium salt are added to the reaction medium is of no consequence. The anion is more typically added to the aqueous solution of zirconium salt.

The amount of anions added is such that the ratio of the number of moles of anions to the number of moles of zirconium is less than 0.5 and preferably ranges from 0.01 to 0.2.

It may be advantageous to add an additional amount of anion, such as that provided by the zirconium salt, in order to control the anionic strength of the medium. The anion is preferably introduced in the form of a salt, preferably an alkali metal, alkaline earth metal or ammonium salt, or in the form of an acid.

An ammonium salt is the preferred.

The proportion of anions added ranges from 0 to 10 moles per mole of zirconium salt.

The heat treatment of the reaction medium is next carried out. This comprises heating it in an enclosed chamber, or reaction zone, to the reaction temperature selected.

Thus, it is a typical autoclaving operation.

It is carried out at a temperature ranging from the reflux temperature of the reaction medium to about 200° C. A temperature of from 100° to 150° C. is preferred.

The speed at which the temperature increases is not critical. The reaction temperature may be reached, e.g., by heating for 30 minutes to 4 hours.

The process of the invention may be carried out by preparing or placing the reaction medium in an enclosed chamber. The pressure will therefore result only from heating the reaction medium.

Under the temperature conditions given above and in an aqueous medium, exemplary conditions are such, for example that the pressure will range from 1 ($10^5$ Pa) to 16 ($16.10^5$ Pa) and preferably from 1 ($10^5$ Pa) to 5 bars ($5.10^5$ Pa).

It is also possible to exert an external pressure, which is then added to the pressure resulting from heating.

The duration of the autoclaving operation is not critical. It may range from 30 minutes to 20 hours, and preferably from 2 to 12 hours.

Upon completion of the operation, the system is cooled to ambient conditions, thus returning it to atmospheric pressure.

The material suspended in the liquid medium is separated by conventional methods of solid/liquid separation, such as filtration, draining and/or centrifuging.

The zirconium precursor is recovered: it is essentially a zirconium oxyhydrate containing residual amounts of physisorbed and/or chemisorbed anions from the initial salt and/or from the anions more covalent than the hydroxyl anion.

The precipitate separated should desirably be washed, essentially to remove the physisorbed anions from the initial salt and anions more covalent than the hydroxyl anion.

Washing is preferably carried out with deionized water or a basic solution, preferably having a concentration of from 1 to 5N.

An ammonia solution is preferred. One or more washed may be carried out, typically from one to five. One embodiment of the wash comprises suspending the precipitate in the wash solution in amounts of 5% to 30%. Further separation is then conducted, as indicated above.

When the precipitate has been separated and preferably washed, it can be calcined directly. It is possible to dry it first, but this operation is optional.

The drying temperature may range from room temperature (usually from 15° to 25° C.) to 100° C. The drying time is not critical and may range from 2 to 48 hours.

In the last stage of the process of the invention, the product obtained is calcined, typically in air, at a temperature of from 150° to 600° C.

The calcination temperature is selected such that it is below the decomposition temperature of the anion. If the anion is the nitrate anion, the temperature preferably ranges from 150° to 300° C. In the case of the preferred anion, namely, the sulfate, a temperature of from 200° to 600° C. is advantageous.

The calcination time may vary widely, from 30 minutes to 10 hours and preferably from 2 to 6 hours.

After calcination, zirconia particulates are obtained having the characteristic microporosity properties according to the invention.

In another embodiment of the invention, thermohydrolysis of the zirconium salt is carried out. The precipitate formed is separated, then treated with an aqueous solution containing at least one anion more covalent than the hydroxyl anion. The treated precipitate is separated, then calcined.

The first stage of the method of the invention, comprising thermohydrolysis of a zirconium salt, is carried out under the same conditions as those described above.

It is an autoclaving operation, providing a precipitate which is essentially a zirconium oxyhydrate containing a small amount of anion from the initial salt, which may be combined or adsorbed to a greater or lesser degree.

The precipitate is separated by conventional methods of solid/liquid separation, such as filtration, draining and/or centrifuging.

As indicated above, the precipitate may be washed, preferably with water or a basic solution, to eliminate the anions from the initial salt, until a pH, preferably ranging from about 8 to about 10, is obtained.

The next stage comprises introducing the anion more covalent than the hydroxyl anion. It may be provided by a salt or an acid, and the aforementioned compounds are well suited therefor.

Again, the sulfate anion is the preferred.

A first technique for contacting the anion with the precipitate comprises suspending the precipitate in the solution containing the anion.

The proportion of precipitate to anion generator will be such that the above ratio, of the number of moles of anions to the number of moles of zirconium, is observed.

The procedure is carried out at room temperature, usually form 15° to 25° C. A pH from 0.5 to 7 is advantageously provided.

The precipitate is separated again, optionally dried, and calcined under the conditions described above.

Another technique entailing use of a sulfate anion comprises treating the precipitate separated after the thermohydrolysis stage, as follows.

It is first dried at a temperature preferably ranging from 150° to 300° C.

The sulfate anion is then provided by a gas such as sulfur trioxide, or a mixture of sulfur dioxide and oxygen. A stream of gas is passed over the dried precipitate for this purpose.

The microporous zirconia may be obtained directly, but it is also possible to carry out a calcining operation.

The zirconia of the invention is thus distinctive in its textural characteristics.

From the standpoint of its chemical composition, it can be said to have the following general formula, given purely by way of illustration:

$$ZrO_{2-x}(OH)_y(A^n)_z \qquad (I)$$

in which a represents the anion more covalent than the hydroxyl anion; n represents the charge of the anion more covalent than the hydroxyl anion; x, y and z are the numbers such that $y+nz=2x$; z is a number less than 0.5; and y is less than 2.0.

It is preferable that z range from 0.01 to 0.2 and that y range from 0.1 to 1.0.

Formula (I) provides the molar percentage of anions in the zirconia according to the invention. It is not, however, intended as an exact definition of the material of the invention, since the anion is not distributed homogeneously therethrough and is present essentially entirely at the face surfaces thereof. By reason of its characteristic properties of microporosity, the zirconia of the invention is useful as a selective adsorbent or as a catalyst or catalytic carrier, particularly for reactions for the conversion of various organic compounds, for example the alkylation of hydrocarbons such as benzene and toluene, the isomerization of paraffins and naphthenes, the conversion of ethers or alcohols into hydrocarbons, oxidation, the dismutation of aromatic compounds such as toluene, reforming, cracking and hydrocracking, the polymerization of compounds having an acetylene moiety, the hydrogenation and dehydrogenation of hydrocarbons, the dehydration of aliphatic compounds, the conversion of aliphatic carbonyl compounds or olefins, and the methanation or hydroxylation of aromatic compounds.

In order to further illustrate the present invention and the advantages thereof, the following specific examples are given, it being understood that same are intended only as illustrative and in nowise limitative.

EXAMPLE 1

In this example, a microporous zirconia was prepared by treating a zirconia precursor with the nitrate anion.

The starting material was a 2.1 mole/liter solution of $ZrOCl_2$ marketed by Societe Magnesium Elektron.

A 0.5 mole/liter solution of zirconyl chloride was prepared by diluting this solution with distilled water. The ionic strength was controlled by adding 2 moles of ammonium chloride per mole of zirconium, under strong agitation.

The solution was placed into an autoclave having a glass-lined internal wall. The contents were brought to 140° C., i.e., about 3.9 bars, for 12 hours by appropriate heating. Upon completion of the hydrothermal treatment, a white precipitate was obtained, which was filtered off using No. 4 fritted glass.

In the next stage, the chloride ions were eliminated by washing the precipitate with an ammonia solution. For this purpose, the precipitate was dispersed in deionized water in a water/zirconia weight ratio of 10. An additional amount of a 1N ammonia solution was stirred in vigorously, until a dispersion having a pH of about 9 was produced.

The precipitate was separated by centrifuging.

The treatment was repeated several times, at the same pH, until the chloride ions disappeared. The elimination of the chloride ions was monitored by argentometry ($AgNO_3$), in the washing solution recovered after the product was centrifuged.

The zirconia precursor was next treated with a nitrate anion. 180 g of the product previously obtained, corresponding to 86.7 g of $ZrO_2$ determined by ignition weight loss at 1,000° C., were dispersed in 500 $cm^3$ of water. A 1N aqueous solution of nitric acid was then added slowly (200 $cm^3$/hr), under vigorous agitation, until a dispersion pH of 2 was obtained (60 $cm^3$).

The product obtained was separated by centrifuging.

The separated product was dried at 100° C. for 48 hours, then calcined in a muffle furnace for 2 hours at 300° C.

The zirconia thus obtained contained nitrate anion in a proportion such that the $[NO_x^-]/[ZrO_2]$ weight ratio was 0.05.

X-ray diffraction analysis evidenced it to have a monoclinic structure.

The zirconia product had the following properties:
 (a) BET specific surface area of 216 $m^2$/g;
 (b) Specific surface area for pores smaller than 13 Å (1.3 nm) in diameter was 190 $m^2$/g;
 (c) Pore volume for:
  (i) pores less than 1,000 Å (100 nm) in diameter=0.22 $cm^3$/g;
  (ii) pores less than 200 Å (20 nm) in diameter=0.12 $cm^3$/g;
  (iii) pores less than 13 Å (1.3 nm) in diameter=0.07 $cm^3$/g.

The same pore volume of 0.22 $cm^3$/g was determined, whether it was measured with carbon tetrachloride [kinetic diameter=7 Å (0.7 nm)] or with trimethylbenzene [kinetic diameter=8.6 Å (0.86 nm)].

Hence, the micropore volume was determined to be 0.07 $m^3$/g with pore sizes ranging from 8.6 Å (0.86 nm) to 13 Å (1.3 nm).

These results were corroborated by xenon NMR characterization. The pores were considered as being in the form of cylindrical channels, and the size of a pore orifice was calculated as 8 Å (0.8 nm).

EXAMPLE 2

In this example, a microporous zirconia was prepared by treating a zirconia precursor with a sulfate anion.

The procedure of Example 1 was repeated, except that the zirconia precursor was treated with sulfuric acid instead of nitric acid.

43 g of the product recovered after washing, corresponding to 20.7 g of $ZrO_2$, were dispersed in 200 $cm^2$ of water. A 1N aqueous solution of sulfuric acid was then added slowly (200 $cm^3$/hour), under vigorous agitation, until a dispersion pH of 2 was obtained (47.5 $cm^3$).

The product obtained was separated by centrifuging. The separated product was dried at 100° C. for 48 hours, then calcined in a muffle furnace for 2 hours at 400° C.

The zirconia obtained contained the sulfate anion in a proportion such that the $[SO_4^=]/[Zr^{4+}]$ molar ratio was 0.12.

The zirconia product had the following properties:
 (a) BET specific surface area of 170 $m^2$/g;
 (b) Specific surface area for pores less than 13 Å (1.3 nm) in diameter was 140 $m^2$/g;
 (c) Pore volume for:
  (i) pores less than 1,000 Å (100 nm) in diameter=0.20 $cm^3$/g;
  (ii) pores less than 200 Å (20 nm) in diameter=0.11 $cm^3$/g;
  (iii) pores less than 13 Å (1.3 nm) in diameter=0.04 $cm^3$/g.

EXAMPLE 3

In this example, a microporous zirconia was prepared from a zirconyl chloride solution.

The starting material was a 2.1 mole/liter solution of $ZrOCl_2$ marketed by Societe Magnesium Elektron.

600 $cm^3$ of a 1.05 mole/liter solution A were prepared from this solution by diluting it with distilled water.

A solution B containing 0.062 mole of ammonium sulfate $(NH_4)_2SO_4$ was also prepared, by adding 8.26 g of this salt, to 250 $cm^3$ of distilled water.

Solutions A and B were placed in a tantalum-cased PROLABO autoclave. The following molar ratios were thus in solution:

$$SO_4^=/Zr^{4+} = 0.1$$

$$H_2O/Zr^{4+} = 68.$$

The solution was heated to 140° C. for 12 hours, under agitation at 150–160 rev/min.

A milky solution was produced.

The solid material was separated by centrifuging.

The separated product was washed with water, by dispersing it in 800 $cm^3$ of distilled water.

The product was separated by centrifuging.

The product was dried at 100° C. for 16 hours, then calcined in a muffle furnace for 2 hours at 400° C.

The zirconia obtained contained sulfate anion in a proportion such that the $[SO_4^=]/[Zr^{4+}]$ molar ratio=0.09.

X-ray diffraction analysis evidenced it to have a monoclinic structure.

The zirconia product had the following properties:
 (a) BET specific surface area of 140 $m^2$/g;
 (b) Specific surface area for pores less than 13 Å (1.3 nm) in diameter of 100 $m^2$/g.

EXAMPLE 4

In this example, a microporous zirconia was prepared by treating a zirconia precursor with a phosphate anion.

The procedure of Example 1 was repeated, except that the zirconia precursor was treated with phosphoric acid instead of nitric acid.

A one liter phosphoric acid solution was prepared, at a concentration of 0.01 mole/liter.

43 g of the product recovered after washing, corresponding to 20.7 g of $ZrO_2$, were rapidly added to this phosphoric acid solution, at ambient temperature and under vigorous agitation. The resulting suspension was agitated for about 1 hour.

The product obtained was separated by centrifuging.

The separated product was dried at 100° C. for 16 hours, then calcined in a muffle furnace for 2 hours at 300° C.

The zironica obtained contained the phosphate anion in a proportion such that the [PO$_4^{3-}$]/[Zr$^{4+}$] molar ratio was 0.1.

X-ray diffraction analysis evidenced that it had a monoclinic structure.

The zirconia product had the following properties:
(a) BET specific surface area of 150 m$^2$/g;
(b) Specific surface area for pores less than 13 Å (1.3 nm) in diameter was 120 m$^2$/g;
(c) Pore volume for:
(i) pores less than 1,000 Å (100 nm) in diameter=0.19 cm$^3$/g;
(ii) pores less than 200 Å (20 nm) in diameter=0.10 cm$^3$/g;
(iii) pores less than 13 Å (1.3 nm) in diameter=0.03 cm$^3$/g.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Microporous zirconia particulates having pores of an average diameter of less than 2 nm, wherein the zirconia particulates contain an anion more covalent than a hydroxyl anion concentrated at the face surface of the particulates.

2. The zirconia particulates as defined by claim 1, having pores of an average diameter no greater than 1.5 nm.

3. The zirconia particulates as defined by claim 1, having a micropore BET specific surface area of at least 150 m$^2$/g, measured after calcination at 300° C.

4. The zirconia particulates as defined by claim 1, having a micropore BET specific surface area of at least 90 m$^2$/g, measured after calcination at 400° C.

5. The zirconia particulates as defined by claim 1, having a micropore BET specific surface area ranging from 90 to 220 m$^2$/g, measured after calcination at 300° to 400° C.

6. The zirconia particulates as defined by claim 1, having a micropore BET specific surface area ranging from 10 to 220 m$^2$/g, measured after calcination at 200° to 600° C.

7. The zirconia particulates as defined by claim 1, having a total pore volume of at least 0.1 cm$^3$/g, measured after calcination at 300° to 400° C.

8. The zirconia particulates as defined by claim 7, having a total pore volume ranging from 0.15 to 0.25 cm$^3$/g.

9. The zirconia particulates as defined by claim 1, having a micropore volume of at least 0.01 cm$^3$/g, measured after calcination at 300° to 400° C.

10. The zirconia particulates as defined by claim 9, having a micropore volume ranging from 0.03 to 0.1 cm$^3$/g.

11. The zirconia particulates as defined by claim 1, having a dual population pore size distribution which comprises micropores of an average diameter ranging from 0.5 nm to 1.5 nm and mesopores of an average diameter ranging from 1.5 nm to 20 nm.

12. The zirconia particulates as defined by claim 11, said micropores having an average diameter ranging from 0.8 nm to 1.2 nm.

13. The zirconia particulates as defined by claim 11, wherein the ratio of the micropore volume to the total volume of the micropores and mesopores ranges from 40% to 70%.

14. Zirconia particulates having the formula:

$$ZrO_{2-x}(OH)_y(A^n)_z$$

in which A is the anion more covalent than the hydroxyl anion, n is the charge of such anion, x, y and z are number such that y+nz=2x, z is a number from 0.01 to less than 0.5, and y is a number from 0.1 to less than 2.0.

15. The zirconia particulates as defined by claim 1, wherein the molar ratio of the number of moles of said anion more covalent than the hydroxyl anion to the number of moles of zirconium is less than 0.5.

16. The zirconia particulates as defined by claim 15, said molar ratio ranging from 0.01 to 0.2.

17. The zirconia particulates as defined by claim 1, said anion more covalent than the hydroxyl anion comprising a nitrate, sulfate, carbonate, phosphate or carboxylate.

18. The zirconia particulates as defined by claim 14, having pores of an average diameter of less than 2 mm.

19. The zirconia particulates as defined by claim 14, having said anion A concentrated at the face surface of the particulates.

20. A process for the preparation of the zirconia particulates comprising thermohydrolyzing an aqueous solution of a zirconium salt, separating the precipitate thus formed from the medium of thermohydrolysis, incorporating an anion more covalent than a hydroxyl anion into said precipitate and then calcining said precipitate.

21. The process as defined by claim 20, wherein the medium of thermohydrolysis comprises said anion more covalent than the hydroxyl anion.

22. The process as defined by claim 20, comprising incorporating said anion more covalent than the hydroxyl anion into the separated precipitate.

23. The process as defined by claim 20, said zirconium salt comprising a halogenated, oxyhalogenated or perhalogenated zirconium compound.

24. The process as defined by claim 23, said zirconium salt comprising zirconium chloride or zirconyl chloride.

25. The process as defined by claim 20, said aqueous solution having a concentration in zirconium ions ranging from 1 to 2.5 moles/liter.

26. The process as defined by claim 20, said anion more covalent than the hydroxyl anion comprising a nitrate, sulfate, carbonate, phosphate or carboxylate.

27. The process as defined by claim 26, said anion more covalent than the hydroxyl anion comprising an alkali or alkaline earth metal or ammonium salt thereof, or an acid.

28. The process as defined by claim 20, wherein the molar ratio of the number of moles of said anion more covalent than the hydroxyl anion to the number of moles of zirconium is less than 0.5.

29. The process as defined by claim 20, comprising washing the separated precipitate prior to the calcination thereof.

30. The process as defined by claim 22, comprising suspending the separated precipitate in a solution of said anion more covalent than the hydroxyl anion.

31. The process as defined by claim 20, comprising drying the separated precipitate prior to the calcination thereof.

32. The process as defined by claim 20, comprising calcining the precipitate at a temperature ranging from 150° to 600° C.

* * * * *